United States Patent [19]

Struve

[11] 4,445,955
[45] * May 1, 1984

[54] WELDING OF PLASTICS MATERIAL

[75] Inventor: Friedrich Struve, Johannesburg, South Africa

[73] Assignee: Gundle Holdings (Proprietary) Limited, Edenvale, South Africa

[*] Notice: The portion of the term of this patent subsequent to Mar. 22, 2000 has been disclaimed.

[21] Appl. No.: 245,799

[22] Filed: Mar. 20, 1981

[30] Foreign Application Priority Data

Mar. 4, 1981 [ZA] South Africa .................. 81/1427

[51] Int. Cl.³ ............... B29C 27/02; B65H 69/08
[52] U.S. Cl. ........................ 156/153; 156/157;
156/244.11; 156/244.23; 156/273.3; 156/304.1;
156/308.4; 156/322; 156/380.9; 156/499;
156/500; 156/509; 156/535; 156/546; 156/574;
156/578
[58] Field of Search ........... 156/157, 244.11, 244.23,
156/272, 308.4, 322, 497, 499, 500, 574, 153,
156/273.2, 304.1, 380.9, 509, 535, 546, 578

[56] References Cited

U.S. PATENT DOCUMENTS 3,839,126 10/1974 Haller ........................... 156/497
4,087,309 5/1978 Lang ............................. 156/497
4,289,552 9/1981 Hammer ..................... 156/322 X
4,377,429 3/1983 Struve ........................... 156/153

FOREIGN PATENT DOCUMENTS 753443 5/1975 South Africa.
774427 7/1977 South Africa.
236887 1/1925 United Kingdom.
848967 9/1960 United Kingdom.
1249168 10/1971 United Kingdom.
1451831 10/1976 United Kingdom.

OTHER PUBLICATIONS

"Kunststoffe," vol. 63, 1973, pp. 772-776.

Primary Examiner—Robert A. Dawson
Attorney, Agent, or Firm—Sughrue, Mion, Zinn, Macpeak and Seas

[57] ABSTRACT

Thermoplastic materials are welded by preheating by conduction and probably damaging the adjacent areas of the surfaces to above the melting point of the thermoplastic material using a suitable heated contact member; depositing a continuous layer of molten thermoplastic material over the adjacent preheated areas of the two surfaces; and allowing the deposited material and the material of the surfaces to solidify.

14 Claims, 6 Drawing Figures

WELDING OF PLASTICS MATERIAL

This invention relates to the welding of thermoplastic materials and particularly but not exclusively to the welding of thermoplastic sheeting.

In this specification the invention is described with particular reference to the welding of sheet material. This should not however be considered as a limitation on the scope of the invention or its application in any way.

One method of welding sheets of plastic material together comprises overlapping the sheets and covering the join with a molten thermoplastic extrudate. When the extrudate solidifies it attaches to each sheet and effectively bridges the join in a sealed manner. Generally the plastic sheet is preheated immediately prior to contact with the extrudate as this enables an extrudate of a lower temperature to be used and provides improved weld characteristics. The preheating is done by either hot air or by a radiation from a source such as one or more halogen lamps.

Disadvantages of the use of hot air or a radiant member as a source of heat are that they are not easily controlled, that is, the degree of preheating may vary from place to place with a resultant change in the strength of the weld. For example a puff of wind could easily momentarily deflect a hot air blast and result in substantially no preheating at all at that particular location.

Although the above method works relatively well on plastic materials such as P.V.C., considerable difficulty has been experienced in the welding of polythene for example. Thus 'peel tests' carried out at elevated temperatures on polythene sheeting which has been welded indicate that the extrudate may simply peel off the polythene substrate as proper welding often does not take place. Peel tests carried out at normal ambient temperatures frequently do not reveal that improper fusion has taken place.

An object of this invention is to provide a method and apparatus for the improved welding of plastics.

According to the invention a method of welding together adjacent surfaces of thermoplastic material comprises:

(a) preheating, by conduction, the adjacent areas of the surfaces to above the melting point of the thermoplastic material using a suitable heated contact member;

(b) depositing a continuous layer of molten thermoplastic material over the adjacent preheated areas of the two surfaces;

(c) allowing the deposited material and the material of the surfaces to solidify.

Further according to the invention the surfaces are the surfaces of a pair of overlapping sheets of thermoplastic material, and the adjacent areas of the surfaces are the areas adjacent to an edge of the surfaces or those areas as well as areas between the two sheets and adjacent to the edge.

Further according to the invention the adjacent areas of the surfaces are physically damaged by the contact member during the preheating by conduction; the damaging of the adjacent areas comprises the formation of substantially new surfaces in those areas; and the preheated surfaces are untouched by any solid plastics material prior to being covered by the deposited layer of thermoplastic material.

Still further according to the invention the conduction preheating of the adjacent areas of the surfaces is preceded by a primary preheating step; and the primary preheating step comprises preheating the adjacent areas using a radiation heat source or hot gases.

The invention also provides an apparatus for continuously welding together adjacent surfaces of thermoplastic material comprising:

at least one contact member for heating the adjacent areas of the surfaces to above the melting point of the material by conduction, the contact member being mounted to follow the contours of the surfaces in use;

means for heating the contact member and means for depositing a continuous layer of molten thermoplastic material onto the heated adjacent areas.

Further according to the invention the contact member is for damaging the adjacent areas during heating; and includes a temperature control device therefor.

Still further according to the invention there are two adjacent contact members for contacting the adjacent areas, and the contact members are independently mounted.

Still further according to the invention the depositing means comprises a metal delivery tube for conveying the molten thermoplastic material said tube terminating in a nozzle at the point of deposition, and a foot of suitable material for supporting the delivery tube and adapted to contact the adjacent surfaces only on opposite sides of the deposited material.

Still further according to the invention the preheating contact member may be integral with the delivery tube.

A preferred embodiment of the invention, described by way of example only, follows with reference to the accompanying drawings in which FIG. 1 is a side elevation of part of a welding apparatus.

In this embodiment of the invention a method of, and an apparatus for, joining overlapping sheets of plastics material, particularly polythene, is described.

As shown in FIGS. 1 to 4 an apparatus for use in the welding of the surfaces adjacent to an edge of a pair of overlapping sheets of polythene material comprises an extruder 1 of the type commonly used in the art. At the bottom of the extruder 1 is an elongated delivery tube 2 which is made from metal, conveniently stainless steel, and terminates in a nozzle 3 at its free end.

Figure 1:
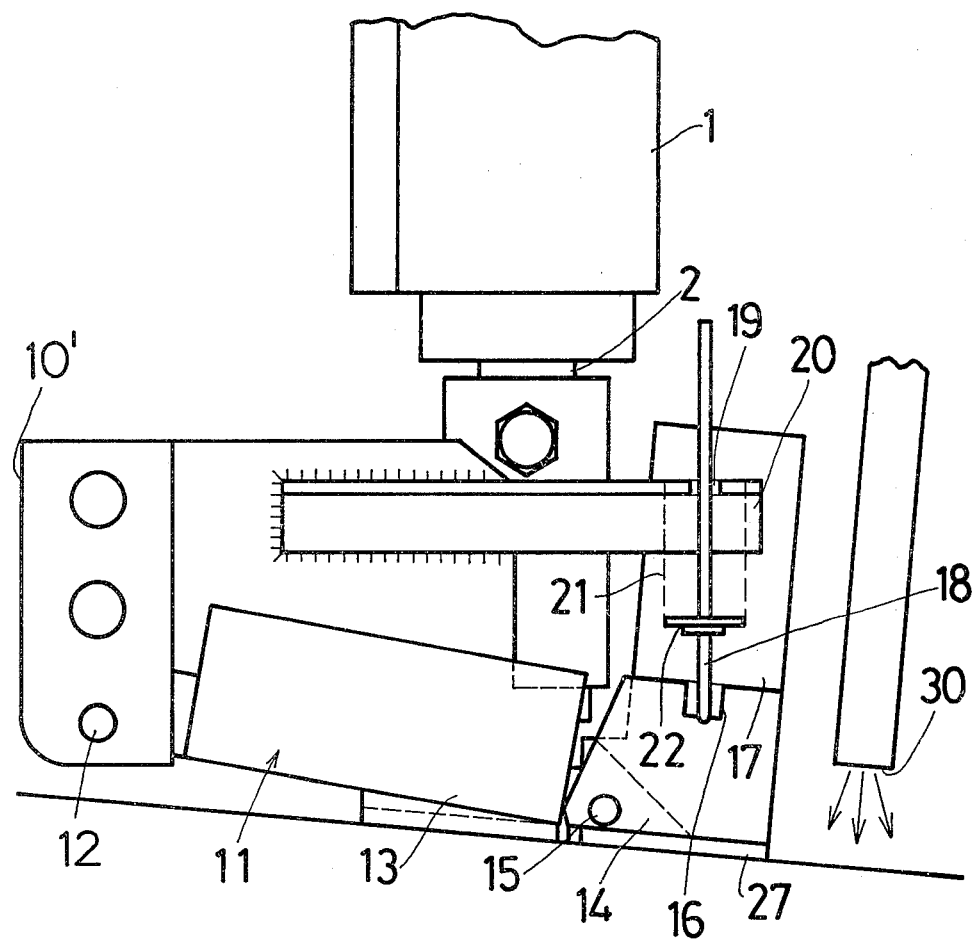
Figure 2:
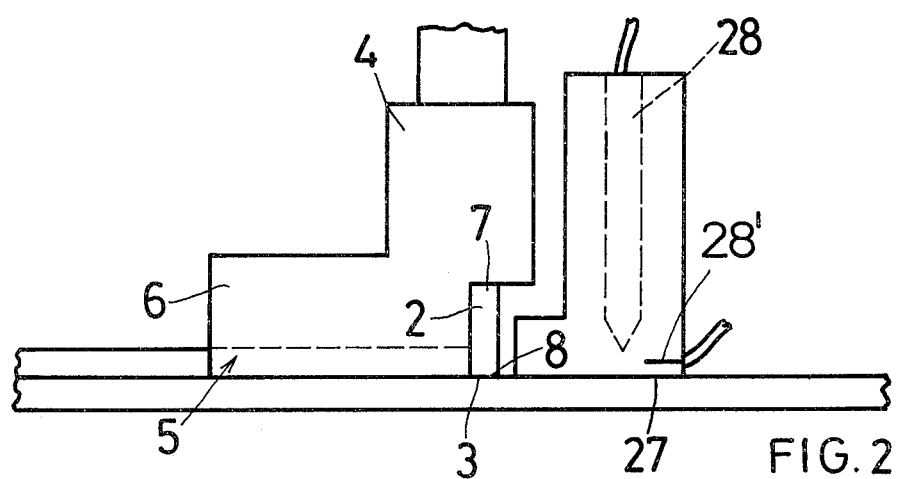
FIG. 2 is an elevation of the delivery tube and nozzle of the welding apparatus.

Along the majority of its length the delivery tube is encased in a fluorocarbon plastic (such as that sold under the trademark "Teflon") sleeve 4 which serves as a heat insulator and which at its lower end terminates in a pair of rearwardly directed support feet 5. The support feet comprise a support member 6 on each of two opposite sides of the delivery tube 2. As shown in FIG. 2, the support member is cut away in its forward region 7 so that there is no "Teflon" in the area of the leading edge 8 of the nozzle 3.

The "Teflon" sleeve 4 is in turn encased in a steel sleeve 9 which supports a rearwardly extending support frame 10. This support frame comprises two rearwardly extending members 10', one on either side of the delivery tube 2 and parallel to the support feet 5.

A forwardly extending linkage 11 is pivotally attached to the lower part of the free end of each support member 10 by means of a pivot 12. Each linkage 11 comprises a rear and a forward link member numbered 13 and 14 respectively and which are connected together by means of a pivot 15. As may be seen from FIG. 1, the rear link member 13 is approximately twice the length of the forward link member 14 so that the pivot 15 is located marginally forwardly of the delivery tube and nozzle 3.

Each of the forward link members 14 has a shallow depression 16 in the upper surface 17 thereof. This depression serves to locate a rod 18 which passes through an aperture 19 in a forwardly extending extension member 20. A compression type coil spring 21 is located between the member 20 and a flange 22 on the rod, thus biasing the rod and hence the forward link member 14 in a direction away from the extruder 1 and hence downwardly in use.

Figure 3:
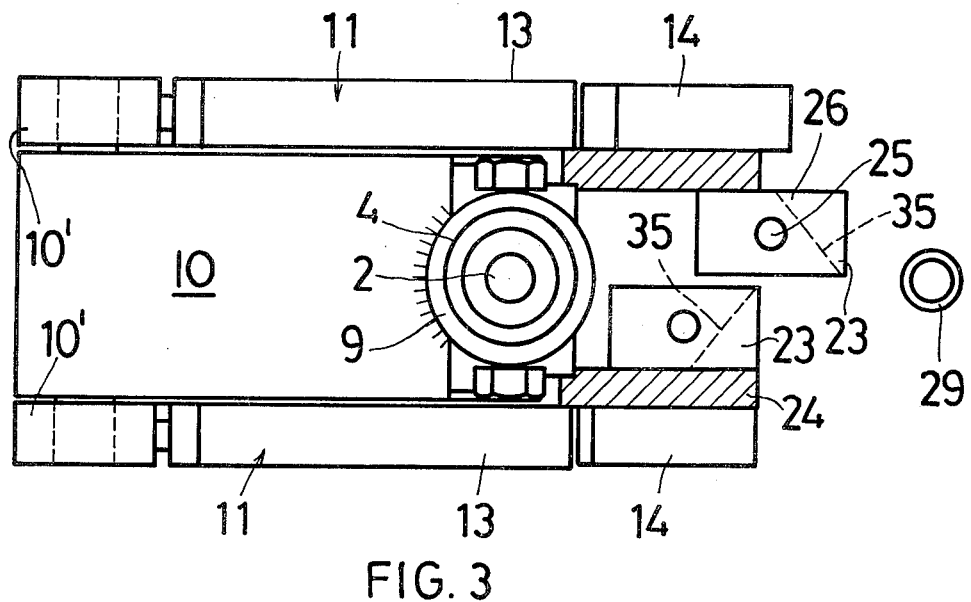
FIG. 3 is a plan of the welding apparatus of FIG. 1.

An elongated contact member 23 of substantially rectangular cross section, as shown in FIG. 3, is attached to each of the forward link members 14 via blocks 24 of a suitable insulating material. The contact members 23 have their axes generally parallel to that of the delivery tube 2 and are located next to each other.

In each of the contact members 23 there is an axial bore 25 which commences at the top 26 of the member and terminates near the bottom or sole 27 thereof. The bores contain elongated electrical heating elements 28 which heat the contact members to a predetermined temperature. This predetermined temperature is controlled by means of a controller (not shown) having a heat sensing device 28' such as a thermocouple or the like embedded in each member near the sole 27 thereof.

Close to the contact members 23 and forwardly thereof is a downwardly depending hot air tube 29 which terminates short of the sole 27 of the contact members in a nozzle 30.

Figure 4:
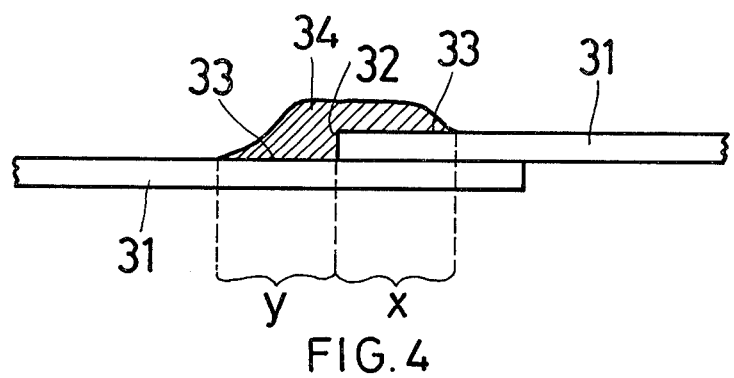
FIG. 4 is a section through a pair of welded surfaces.

As mentioned above, the apparatus is designed specifically for welding together the overlapping edges of sheets of thermoplastics material such as polythene. As shown in FIG. 4 the edge portions of the sheets 31 are overlapped and the apparatus described above, is moved along the edge 32 of the top sheet so that the areas X and Y of the two sheets are covered by the machine.

As the machine moves along the material it is preheated to a predetermined low temperature by means of a blast of hot air emitted from the nozzle 30 of the hot air tube 29. Thereafter, the two contact members 23, one for each of the areas X and Y, move along the initially preheated adjacent areas of the sheets in intimate contact. The temperature of the contact members 23 is such that the upper surfaces 33 of the two sheets are raised to above the melting point of the thermoplastic material and are thus in a substantially liquid state. Simultaneously the contact members damage the surfaces 33 to ensure that damaged and hence substantially new surfaces of molten material are presented to the nozzle 3 of the delivery tube 2 of the extruder 1.

It should be noted here that there is no "Teflon" or other plastics material in contact with the new or damaged surfaces between the contact members 23 and the metal nozzle 3 as it is believed from experimental work carried out that the presence of such material leads to poorer welding characteristics.

As the new surfaces pass under the nozzle 3 they are covered with a continuous layer of molten material 34 which solidifies after a short time and welds the two surfaces together as shown in FIG. 4 of the drawings.

Peel tests conducted at elevated temperatures indicate that the weld produced by the aforementioned method and apparatus has far better characteristics than welds produced using conventional preheated surfaces. These tests show that the above method produces an area in which the weld material deposited is intimately mixed with the material of the sheets joined. In order to further enhance the properties of the new surfaces produced by the contact members, it is envisaged that each contact member may be provided with an outwardly directed angled step (or other physical contour) in the sole thereof as indicated in dotted lines and by numeral 35 in FIG. 3. Such inclined steps would provide the contact members with a ploughing action and would tend to divert the uppermost layer of the material being welded to the outside of the weld. This uppermost layer often being 'waxy' and difficult to weld.

As mentioned above, the temperature of each contact member is controlled to ensure melting of the upper surface of the material being welded. However, it should be noted that the temperature of the molten surface should be carefully controlled as an excessive temperature may lead to degradation of the plastics material and the formation of waxes. Such waxes would severely reduce the properties of the final weld.

Figure 5:
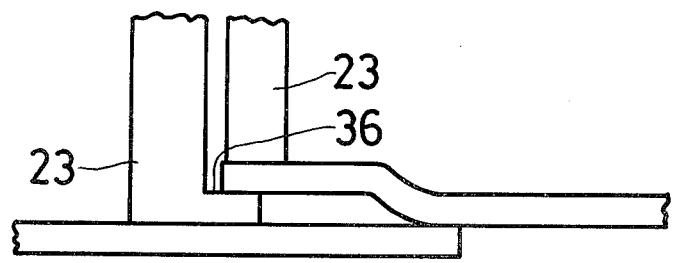
FIG. 5 is an elevation of alternative contact members for the welding apparatus.

An alternative configuration of the contact members 23 is shown in FIG. 5 of the drawings.

Figure 6:
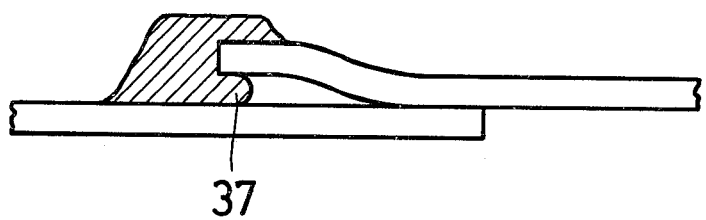
FIG. 6 is a section through a pair of surfaces welded using the alternative contact members.

In this variation the one contact member has an inwardly directed flange 36 which projects below the other contact member. In use, the flanged contact member is adapted to be in contact with the surface of the lower of the two sheets and projected between the two sheets so that the upper sheet is sandwiched between the top surface of the flange and the sole of the other contact member 23. In this way, the surfaces between the two sheets may also be heated and damaged in the manner described above and the extruded thermoplastics material allowed to flow between the two sheets as indicated at 37 in FIG. 6. This would provide for increased weld strength.

Other embodiments are envisaged within the scope of the invention and include other configurations thereof and particularly include:
  (a) welding apparatus having a single contact member integral with the delivery tube 2 and nozzle 3;
  (b) welding apparatus as described but being mounted on driven equipment so that the forward speed of the apparatus can be varied and controlled;
  (c) welding apparatus as described but being hand held and propelled but having a speed measuring device mounted onto the welding head so that a substantially constant correct welding speed can be maintained by the operator.

What I claim as new and desire to secure by Letters Patent is:

1. A method of welding together two adjacent sheets of flexible thermoplastic plastics material, comprising:
  (a) overlapping the edges of two sheets of plastics material such that they have a pair of adjacent surface areas to be welded on either side of a common boundary line;

(b) preheating by direct contact conduction with both sheets the adjacent surface areas of both sheets to above the melting point of the thermoplastic material using a suitable heated contact member;

(c) simultaneously physically damaging the molten surface areas of both sheets to form substantially new surfaces;

(d) depositing a continuous layer of molten thermoplastic material over the preheated and damaged surfaces of both sheets; and (e) allowing the deposited material and the material of both surfaces to solidify as a continuous phase.

2. A method as claimed in claim 1 in which the common boundary line is defined by the edge of the overlapping sheet.

3. A method as claimed in claim 2 in which the adjacent surfaces between the overlap of the two sheets are melted together.

4. A method as claimed in claim 1 in which the preheated surfaces are untouched by any solid plastics material prior to being covered by the deposited layer of thermoplastic material.

5. A method as claimed in claim 1 in which the conduction preheating of the adjacent areas of the surfaces is preceded by a primary preheating step.

6. A method as claimed in claim 5 in which the primary preheating step comprises preheating the adjacent areas using a radiation heat source.

7. A method as claimed in claim 5 in which the primary preheating step comprises heating the adjacent areas using hot gases.

8. An apparatus for continuously welding together adjacent surfaces of two sheets of thermoplastic material comprising: at least one contact member for heating overlapped adjacent areas of the surfaces of both sheets to above the melting point of the material by direct contact conduction with both sheets to physically damage both molten surface areas and form substantially new surfaces; the contact member being mounted to follow the contours of both surfaces in use; means for heating the contact member; and means for depositing a continuous layer of molten thermoplastic material onto both of the heated adjacent areas.

9. An apparatus as claimed in claim 8 in which the contact member includes a temperature control device therefore.

10. An apparatus as claimed in claim 8 in which there are two adjacent contact members for contacting the adjacent areas and the contact members are independently mounted.

11. An apparatus as claimed in claim 8 in which the depositing means comprises a metal or ceramic delivery tube for conveying the molten thermoplastic material, said tube terminating in a nozzle at the point of deposition.

12. An apparatus as claimed in claim 11 which includes a foot of suitable material for supporting the delivery tube and adapted to contact the adjacent surfaces only on opposite sides of the deposited material.

13. An apparatus as claimed in claim 8 in which the means for depositing the thermoplastic material is integral with the delivery tube.

14. An apparatus as claimed in claim 8 in which the contact member is independent of the means for depositing the thermoplastic material.

* * * * *